United States Patent
Zhu (10) Patent No.: US 11,425,025 B2
(45) Date of Patent: Aug. 23, 2022

(54) METHOD FOR PROVIDING A LOW-LATENCY, DISTRIBUTED, MULTI-USER APPLICATION THROUGH AN EDGE CLOUD PLATFORM

(71) Applicant: Zhongwen Zhu, Saint-Laurent (CA)

(72) Inventor: Zhongwen Zhu, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 142 days.

(21) Appl. No.: 16/697,981

(22) Filed: Nov. 27, 2019

(65) Prior Publication Data
US 2021/0160165 A1 May 27, 2021

(51) Int. Cl.
*H04L 45/121* (2022.01)
*H04L 12/46* (2006.01)
(Continued)

(52) U.S. Cl.
CPC ........ *H04L 45/121* (2013.01); *H04L 12/4633* (2013.01); *H04L 47/225* (2013.01);
(Continued)

(58) Field of Classification Search
CPC . H04L 45/121; H04L 12/4633; H04L 47/225; H04L 67/10; H04L 67/2814; A63F 13/30; A63F 13/35
See application file for complete search history.

(56) References Cited

U.S. PATENT DOCUMENTS

2011/0078230 A1* 3/2011 Sepulveda .......... H04L 67/1004
709/203
2019/0319847 A1* 10/2019 Nahar ................... H04L 41/044
(Continued)

FOREIGN PATENT DOCUMENTS

EP 3209061 A1 8/2017
EP 2923459 B1 5/2018
(Continued)

OTHER PUBLICATIONS

International Search Report and Written Opinion issued on corresponding International Application No. PCT/IB2020/060364, dated Jan. 25, 2021.

*Primary Examiner* — Yaotang Wang
(74) *Attorney, Agent, or Firm* — Julie Dufort; Ericsson Canada Inc.

(57) ABSTRACT

The disclosure relates to an Edge Cloud Platform (ECP) and a method executed in the ECP, for providing a low-latency, distributed, multi-user application. The method comprises determining a first location of a first group of users requesting access to the multi-user application and deploying the multi-user application in a first Point of Presence (PoP) in a first Service Provider (SP) domain operative to serve the first group of users. The method comprises determining a second location of a second group of users requesting access to the multi-user application and deploying a proxy of the multi-user application in a second PoP in a second SP domain operative to serve the second group of users. The method comprises, upon determining that a Software License Agreement (SLA) exists between the first and second SPs, establishing a tunnel for linking the multi-user application and the proxy of the multi-user application, thereby providing the low-latency.

16 Claims, 8 Drawing Sheets

(51) Int. Cl.
*H04L 47/22* (2022.01)
*H04L 67/10* (2022.01)
*H04L 67/563* (2022.01)
*A63F 13/30* (2014.01)

(52) U.S. Cl.
CPC .......... *H04L 67/10* (2013.01); *H04L 67/2814* (2013.01); *A63F 13/30* (2014.09)

(56) References Cited

U.S. PATENT DOCUMENTS

2020/0067734 A1\* 2/2020 Hira .................. H04L 45/64
2021/0158260 A1\* 5/2021 Kolar .................. G06N 20/00

FOREIGN PATENT DOCUMENTS

NO 2014080304 A2 5/2014
WO 2018166111 A1 9/2018

\* cited by examiner

METHOD FOR PROVIDING A LOW-LATENCY, DISTRIBUTED, MULTI-USER APPLICATION THROUGH AN EDGE CLOUD PLATFORM

TECHNICAL FIELD

The present disclosure relates to edge deployment of online gaming applications in 5G mobile and cable operator networks.

BACKGROUND

With the rapid evolution of cloud computing, edge computing and content delivery technology, traditional gaming applications have been gradually shifting from an "off-line" to an "on-line" mode. This shift has occurred because online gaming provides flexibility for the game players in terms of play time, location, and mobility. Furthermore, it also brings different players together from different places around world.

In some gaming applications, the interaction among game players or the interaction between the game player and the gaming server is critical to provide a good user experience. Usually, gaming servers run on either local gaming devices or on remote virtual machines residing in the cloud. In all cases, the faster the interactions are, the better the game player's experience is.

Hence, the latency for the inter-player or player-game server interactions plays an important role in the deployment of the gaming application, especially for online gaming. Any delay due to network congestion might interrupt an ongoing game session and turn down requests from the game player's.

SUMMARY

There is provided a method for providing a low-latency, distributed, multi-user application through an Edge Cloud Platform. The method comprises determining a first location of a first group of users requesting access to the multi-user application and deploying the multi-user application in a first Point of Presence (PoP) in a first Service Provider (SP) domain operative to serve the first group of users. The method comprises determining a second location of a second group of users requesting access to the multi-user application and deploying a proxy of the multi-user application in a second PoP in a second SP domain operative to serve the second group of users. The method comprises, upon determining that a Software License Agreement (SLA) exists between the first and second SPs, establishing a tunnel for linking the multi-user application and the proxy of the multi-user application, thereby providing the low-latency.

There is provided an Edge Cloud Platform (ECP) for providing a low-latency, distributed, multi-user application. The ECP comprises processing circuits and a memory, the memory containing instructions executable by the processing circuits whereby the ECP is operative to determine a first location of a first group of users requesting access to the multi-user application and deploy the multi-user application in a first Point of Presence (PoP) in a first Service Provider (SP) domain operative to serve the first group of users. The ECP is further operative to determine a second location of a second group of users requesting access to the multi-user application and deploy a proxy of the multi-user application in a second PoP in a second SP domain operative to serve the second group of users. The ECP is further operative to, upon determining that a Software License Agreement (SLA) exists between the first and second SPs, establish a tunnel for linking the multi-user application and the proxy of the multi-user application, thereby providing the low-latency.

The method and Edge Cloud Platform provided herein present improvements to the way gaming application operate and are deployed.

DETAILED DESCRIPTION

Various features will now be described with reference to the figures to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these may be illustrated with dashed lines.

Figure 1:
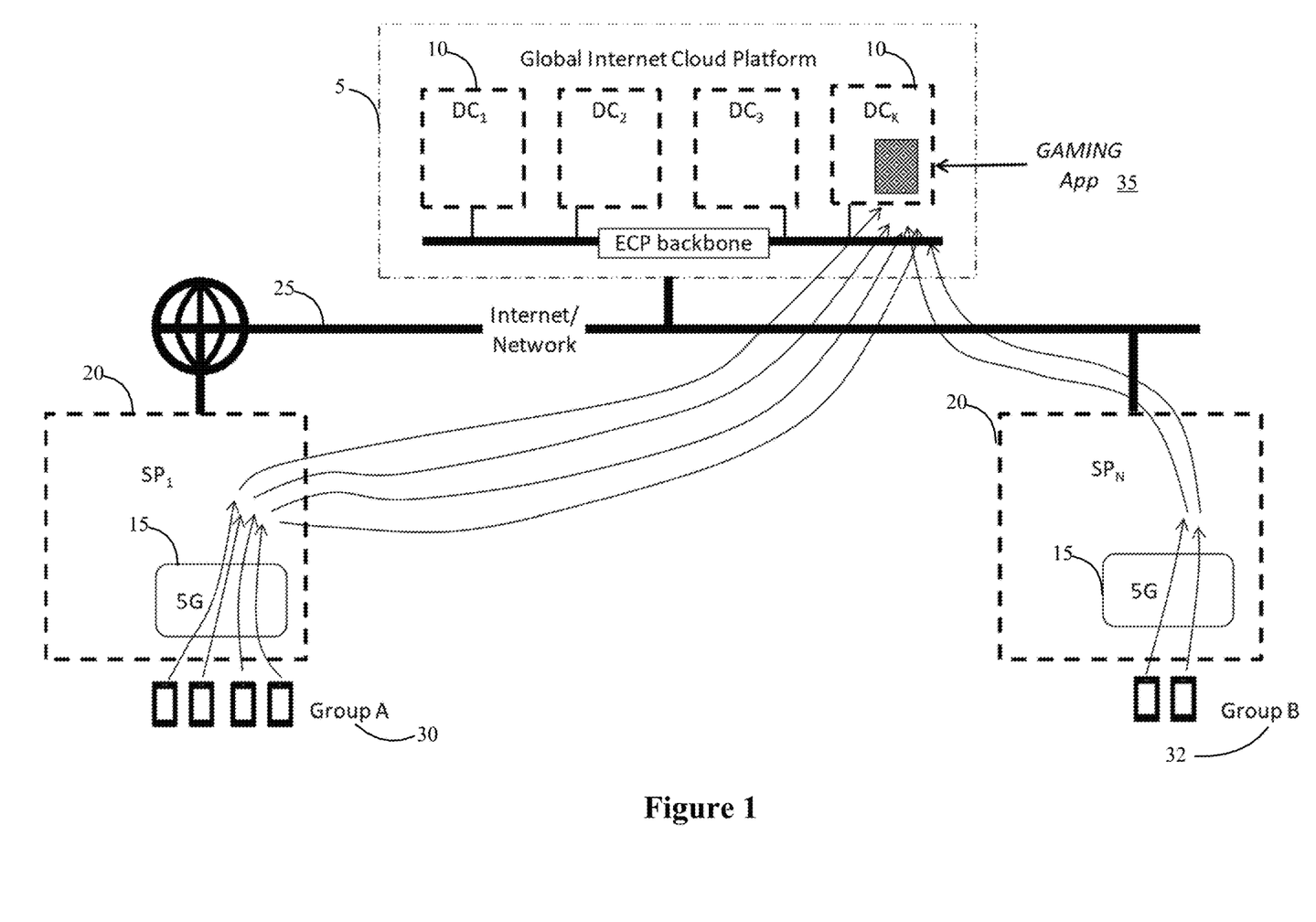
FIG. 1 a schematic illustration of a gaming application deployed in a global cloud platform.

Referring to FIG. 1, the current global cloud platforms, such as Google Cloud Platform (GCP) 5, Amazon Web Service (AWS) or Microsoft Azure, allow tenants to deploy their applications 35 in servers deployed in their cloud environment. Although the servers (data centers (DCs) 10) are deployed in different locations, where some locations are supposed to be closer to end users, it is still required that access networks 15 from the Internet Service Providers (ISP) 20 engage with end users. The access network is the so-called "last mile access".

Since the global cloud platforms operate on top of internet service providers, the connection between their GCP servers and the nodes in the internet service provider network 20 normally goes through Internet 25 if they don't have any Software License Agreement (SLA) between them. The internet connection causes delays in the north-south traffic (GCP to ISP and ISP to GCP) i.e. between the end users and the applications. For gaming application, this type of delays need to be reduced.

FIG. 1 illustrates a problem currently encountered with gaming applications deployed in a global cloud platform. As shown in the figure, the users in group A 30 are subscribers of a Service Provider (SP) $SP_1$, and the users in group B 32 are subscribers of $SP_N$. A gaming application 35 is deployed in the Global Cloud Platform 5, such as AWS or GCP. The following assumptions are made. (1) All the game players in group A 30 are in New York. (2) All the game players in group B 32 are in Montreal. (3) Group A has more players than Group B. (4) AWS or GCP has a data center 10 located in New York, but no data center located in Montreal. (5) The gaming application 35 for both groups of players is deployed in the New York data center, which is closer to Group A.

Latency issues on gaming players can be expected due to the Internet connection 25 and due to the physical location of the players, since there is no Quality of Service (QoS) in place for the traffic paths between the end users and the gaming server deployed in the New York data center.

When user in both group A and B play the same game at the same time (collaboratively or against each other), how can the game experience be improved, how it is possible to provide to all game players a fair play in terms of the request-response turn-around time?

Figure 2:
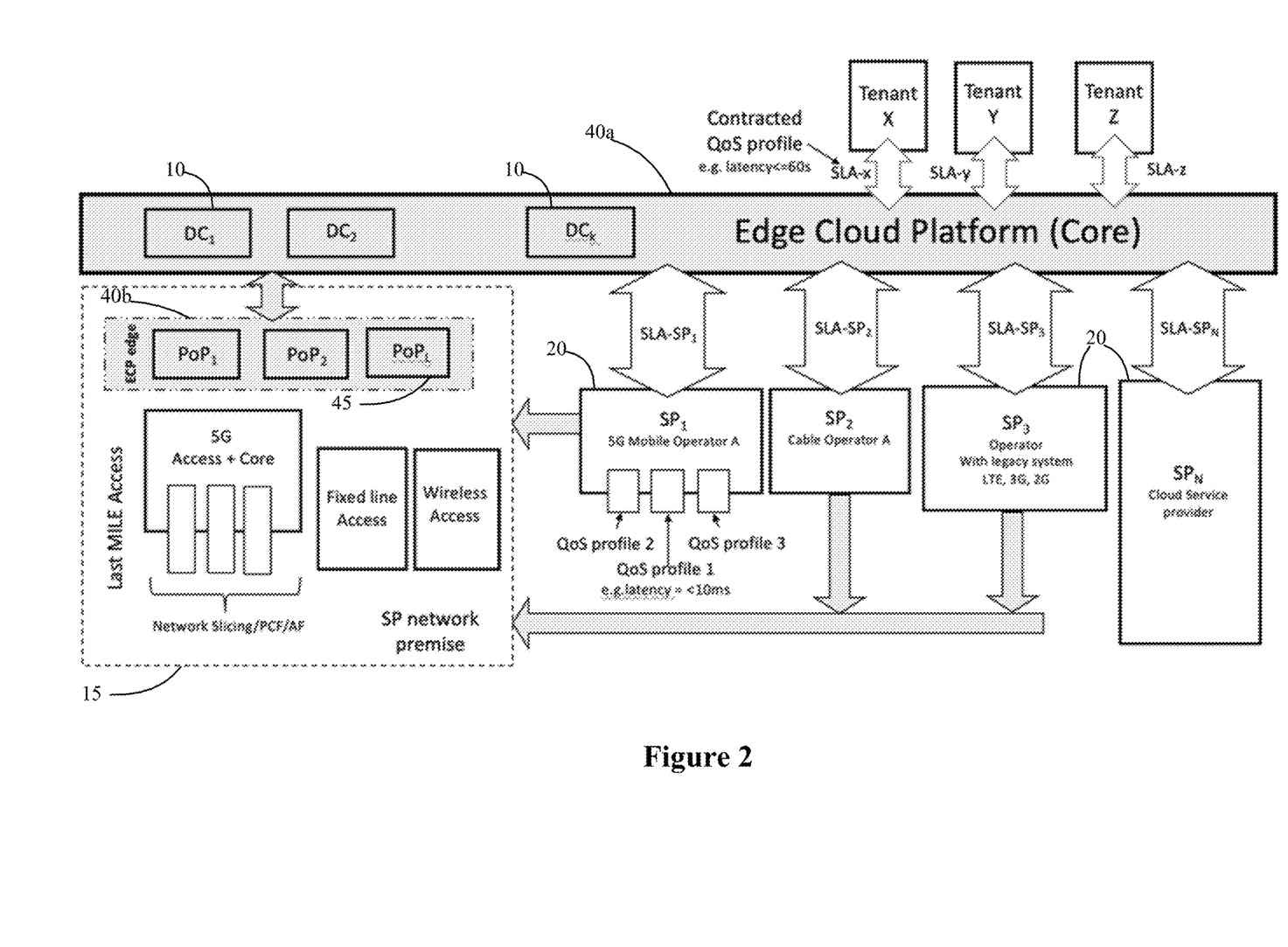
FIG. 2 is a schematic illustration of tenant and service provider relationship through an Edge Cloud Platform.

Turning to FIG. 2, one way to solve this problem is to introduce the new architecture of Edge Cloud Platform (ECP) 40a and 40b, generally 40, using SLA to guarantee certain QoS on specific traffic paths. Within the architecture, the allocation of the main gaming server is dynamic and corresponding gaming proxy server are auto-generating in different service provider's premises to make a sure that all the game players are treated fairly within a game.

The proposed new architecture consists of two parts, one is called the "Core part" 40a and the other is called the "Edge part" 40b. Both are described in details hereafter.

The Core part 40a of ECP owns all the data centers 10 in which the ECP computing nodes, ECP delivery nodes, control nodes, monitoring nodes and analytic nodes are deployed. Those data centers 10 reside in different geographical locations based on the business needs. All the data centers 10 are connected to Internet via secure means, such as Firewall (FW) settings. ECP also provides the direct connections to the ECP backbone network 27 (FIG. 3) to the service providers having SLA with ECP.

The Edge part 40b of ECP deploys computing nodes and delivery nodes inside different service provider's 20 network. Those nodes are adjacent to SP access network 15, such as 5G access network (which support network slicing function). It is assumed that QoS from the edge nodes to the end users can be guaranteed. Regarding the horizontal traffic from west to east (at similar levels in the network) i.e. between different geographical locations, according to SLA, service provider might give an option for ECP to peer up with other service providers 20 using techniques such as peering or transit. In addition, the concept of Point of Presence (PoP) 45 can be used to group serval edge nodes within a specific service provider, thereby providing an abstraction level for the edge level.

Still referring to FIG. 2, ECP 40 can be designed to provide two kinds of accounts, one for the tenants, the other for the service provider. An ECP administrator (operating the network) is able to access all those accounts. The service provider provides the computing and delivery nodes, as well as the physical network connectivity. ECP builds up the services, such as Bare-metal Machine as a Service (BMaaS), Virtual Machine as a Service (VMaaS) and Container as a Service (CaaS), etc., on top of the physical infrastructure, which can be offered to tenants. The SLA that contains different QoS profiles is used by the tenants or the service provider to secure the QoS on end-to-end traffic flows on a per application or per user basis, for example.

Figure 3:
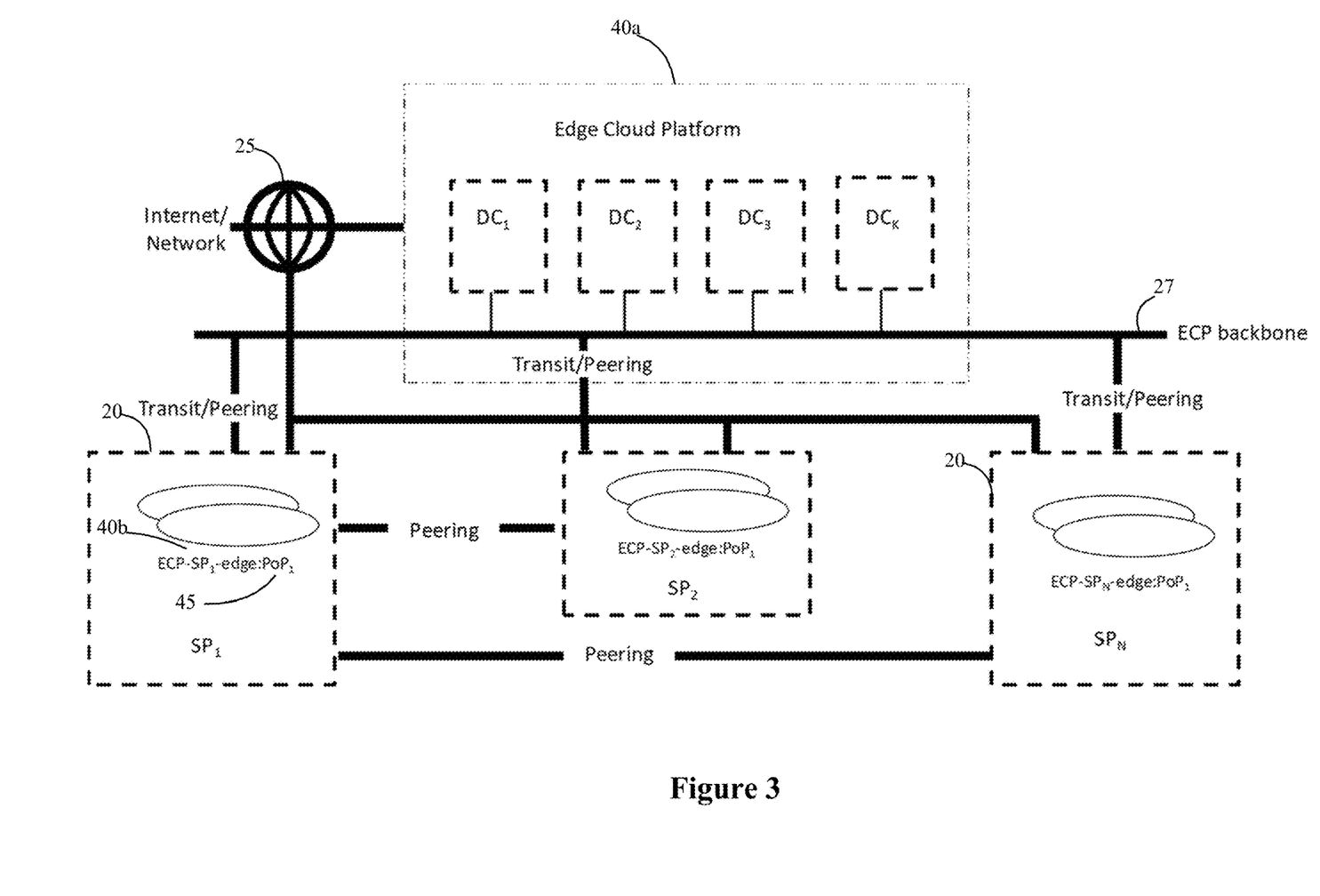
FIG. 3 is a schematic illustration of an example network connectivity for an Edge Cloud Platform.

As shown in FIG. 3, within the SP 20 premise, ECP 40 deploys the computing nodes and delivery nodes through PoP 45. Those nodes can be connected to the ECP backbone 27 through transit or peering. Also based on the SLA, the traffic from one service provider to the other service providers can be done via peering or through the ECP core. All the nodes or SP PoPs are connected to the Internet 25 by default.

In the case of a gaming application, a proxy is automatically generated in the corresponding service providers to make a sure that fairness is maintained among the game players for the same game. The mechanism for deploying the gaming application as well as gaming proxy will be described further below.

Figure 4:
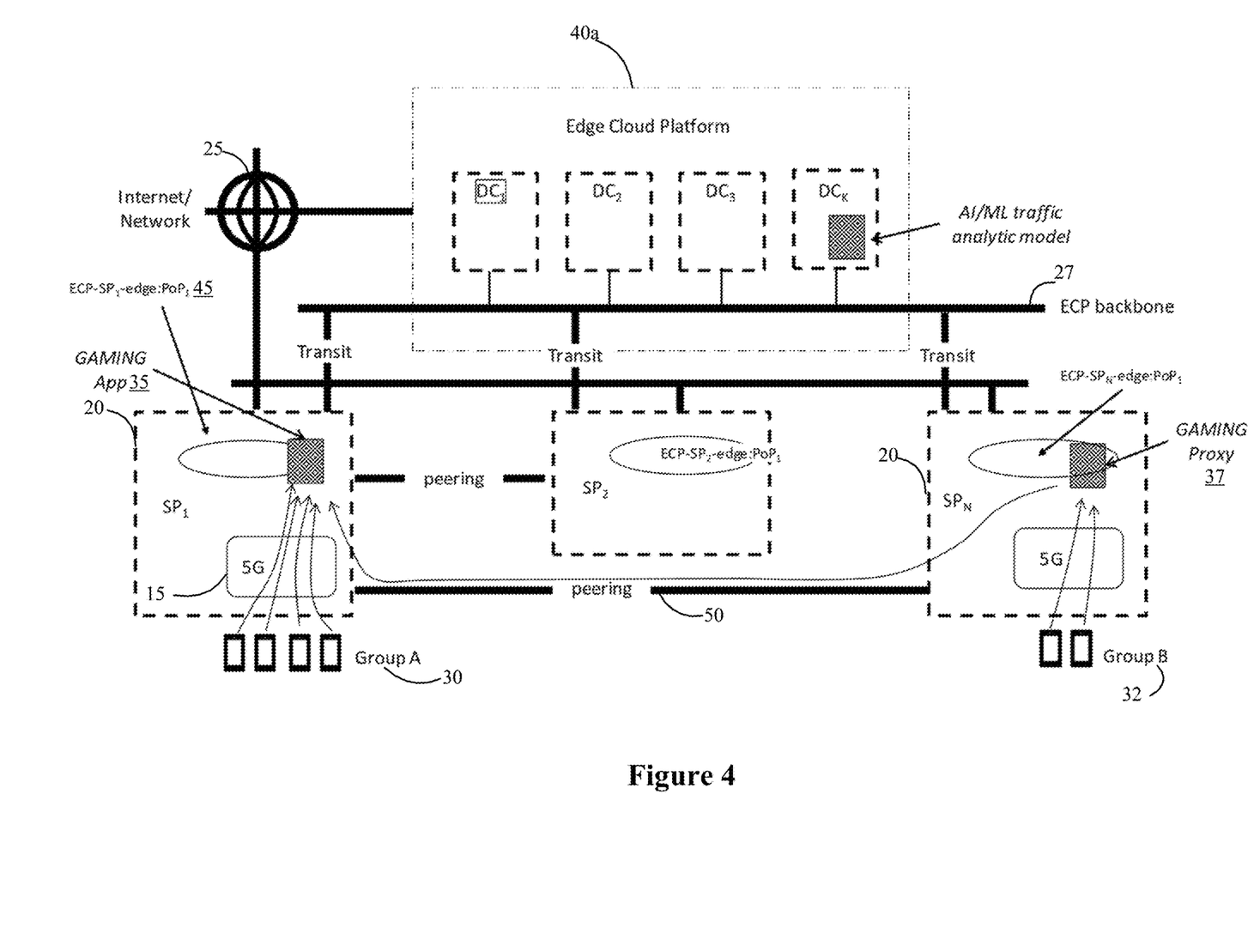
FIG. 4 is a schematic illustration of a flow executed in the example network of FIG. 3, in which a gaming server is access by group A and a proxy is access by group B.
Figure 5:
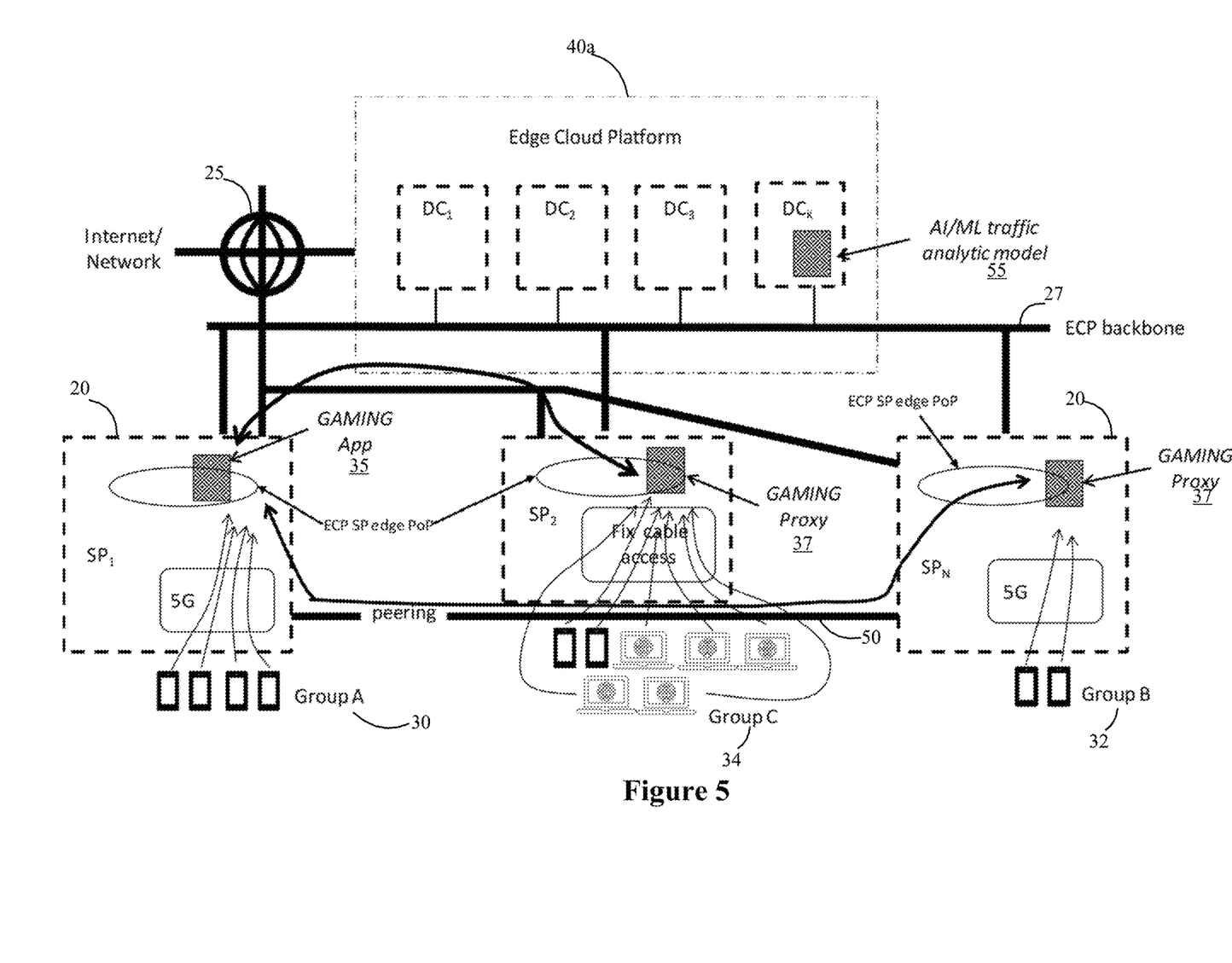
FIG. 5 is a schematic illustration of a flow executed in the example network of FIG. 3, but where some connectivity is modified, and in which the gaming server is access by group C via Internet.
Figure 6:
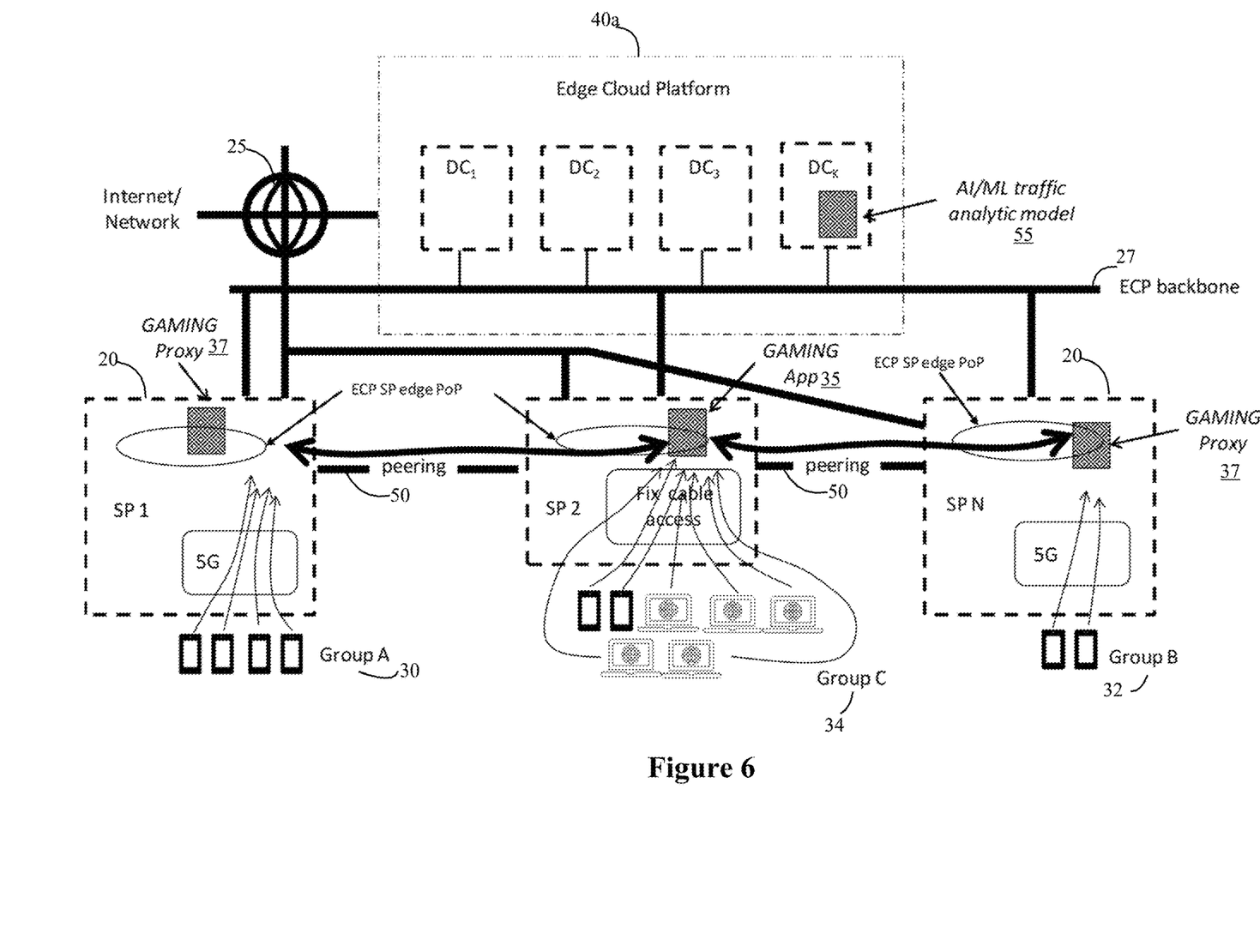
FIG. 6 is a schematic illustration of a flow executed in the example network of FIG. 3, but where some connectivity is modified, and in which the gaming server is relocated and is accessed by group C directly.

Three scenarios are presented in relation with FIGS. 4-6. In case 1, FIG. 4, the same game is played by both groups, A 30 and B 32, using SP neighbor peering 50. In case 2, FIG. 5, the same game is played by groups A 30, B 32 and C 34. The involvement of group C is done through an Internet connection. In case 3, FIG. 6, the same game is played by group A 30, B 32 and C 34. This scenario presents the relocation of the gaming server based on the traffic pattern of end users. Group C accesses the gaming server directly within the same service provider premise.

Referring to FIG. 4, both groups, A 30 and B 32, are playing the same game, which is provided by the gaming server 35 deployed in ECP $SP_1$ 20 edge PoP 45. This location is selected for the gaming server because there are four players in Group A and only two in Group B, who are tied to $SP_2$. In ECP $SP_2$ edge PoP, ECP deploys a proxy 37 of the gaming application, which proxies the requests of the players in Group B to the gaming server in ECP $SP_1$ edge PoP. In order to have a required QoS on the traffic path from $SP_2$ to $SP_1$, a peering link 50 is used instead of a link via Internet 25. With this kind of settings, the QoS on the traffic from Group A to the gaming server as well as that from Group B to the gaming server is guaranteed. The fairness among different game players is respected.

The second case is illustrated hereafter and occurs after both groups, A and B, start the online game, i.e. when group C joins the game session in which both groups A and B are already playing.

Referring to FIG. 5, it is assumed that in the SLA between the ECP tenant, which is the gaming supplier, and the ECP, there is no "peering" set between $SP_2$ and $SP_1$. Therefore, all the new game players from Group C have to go through the Internet 25 to access the gaming server deployed in the ECP $SP_1$ edge PoP. It is expected that the game players in Group C 34 will experience delay i.e. latency issue.

The traffic performance degradation may be logged in access log files or may be acquired using other methods such as real-time monitoring tools to collect performance data, which are consumed by an ECP analytic solution 55. Based on the outcome of the analytic solution and also based on ECP monitoring, a notification or alarm is sent to the game tenant. This triggers the tenant to reset QoS profile (using peering between $SP_2$ and $SP_1$) for the gaming application.

This eventually leads to case 3, described in FIG. 6, in which the gaming application is deployed or moved in the ECP SP$_2$ edge PoP, since Group C is the largest group. Two gaming proxies 37 are deployed in SP$_1$ and SP$_N$ 20 respectively, in this scenario. The peering 50 between SP$_1$ and SP$_2$ and the peering 50 between SP$_2$ and SPN are used to have a QoS on the traffic between the gaming server and group A and B respectively.

The location selection for the gaming server 35 and gaming proxy 37 can be done automatically based on the outcome of an ECP data analytic 55 solution. The prediction of the traffic pattern (against time) can be made using Artificial Intelligence (AI)/Machine Learning (ML) algorithms, such as the reinforcement learning algorithm that takes the traffic data logs as its input to predict the traffic patterns towards the gaming server for a next epoch. Those data logs are collected by ECP from the gaming servers deployed in different locations.

For instance, at the time t1, a gaming server is deployed in location A in SP1, and the game proxy is deployed in location C in SP2. This is because much more requests from end users go to location A compared to location C.

The ECP AI/ML algorithm predicts that at the time t2, more requests will go to location C instead of A. As a result, ECP deploys the new gaming server in location C in SP2, and a new gaming proxy in location A in SP1.

When both new gaming server and proxy are ready, the old/existing gaming server and proxy redirect their client requests to the new gaming server and proxy. After all the existing gaming sessions are successfully moved to the new gaming server, ECP removes/deletes these old (out-of-data) gaming servers and proxies.

Now the new gaming server and proxy provide good gaming performance towards the end users. Several advantages are provided by the techniques described herein. The service providers may gain traffic from gaming application, by leveraging their access networks assets, especially with 5G mobile access networks. The tenants benefit from the fast response from delivery nodes to its subscriber's requests, which may allow to attract more game players to utilize the gaming service. The end user can benefit by having a good or improved user experience using "online gaming".

Figure 7:
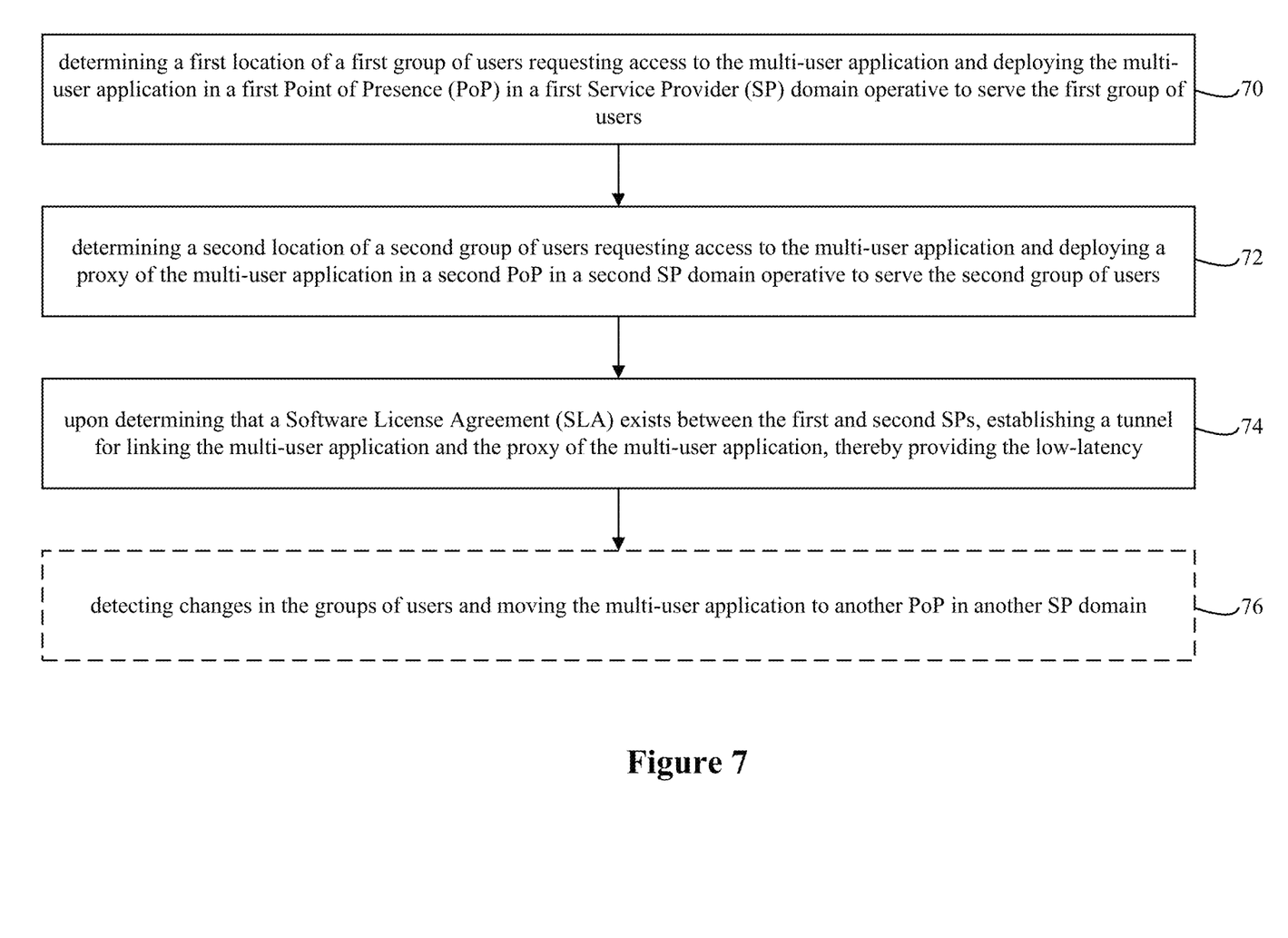
FIG. 7 is a flowchart of a method for providing a low-latency, distributed, multi-user application through an Edge Cloud Platform.

FIG. 7 is a flowchart of a method for providing a low-latency, distributed, multi-user application through an Edge Cloud Platform. The method comprises determining, step 70, a first location of a first group of users requesting access to the multi-user application and deploying the multi-user application in a first Point of Presence (PoP) in a first Service Provider (SP) domain operative to serve the first group of users. The method comprises determining, step 72, a second location of a second group of users requesting access to the multi-user application and deploying a proxy of the multi-user application in a second PoP in a second SP domain operative to serve the second group of users. The method comprises, upon determining that a Software License Agreement (SLA) exists between the first and second SPs, establishing, step 74, a tunnel for linking the multi-user application and the proxy of the multi-user application, thereby providing the low-latency.

The multi-user application may be a gaming application. The multi-user application and the proxy of the multi-user application may be deployed by a traffic manager. The traffic manager may select a largest group of users as the first group of users. The traffic manager may select the first group of users, among multiple groups of users, based on network characteristics that enable achieving lower latencies for all groups of users. The characteristics that enable to achieve lower latencies for all groups of users may be determined using data analytics of network characteristics, a number of users per location, a network status or traffic characteristics.

The method may further comprise detecting, step 76, changes in the groups of users and moving the multi-user application to another PoP in another SP domain. The changes may include more users or less users at a given location, a new group of users at a new location, all users "dropped" at another given location, and wherein moving the multi-user application to another PoP in another SP domain reduces a cumulative latency. The users may be connected through any one of: a cable connection, a short range wireless connection, a long range wireless connection. The tunnel may be established using peering or transit.

Referring again to FIG. 8, there is provided a virtualization environment in which functions and steps described herein can be implemented.

Figure 8:
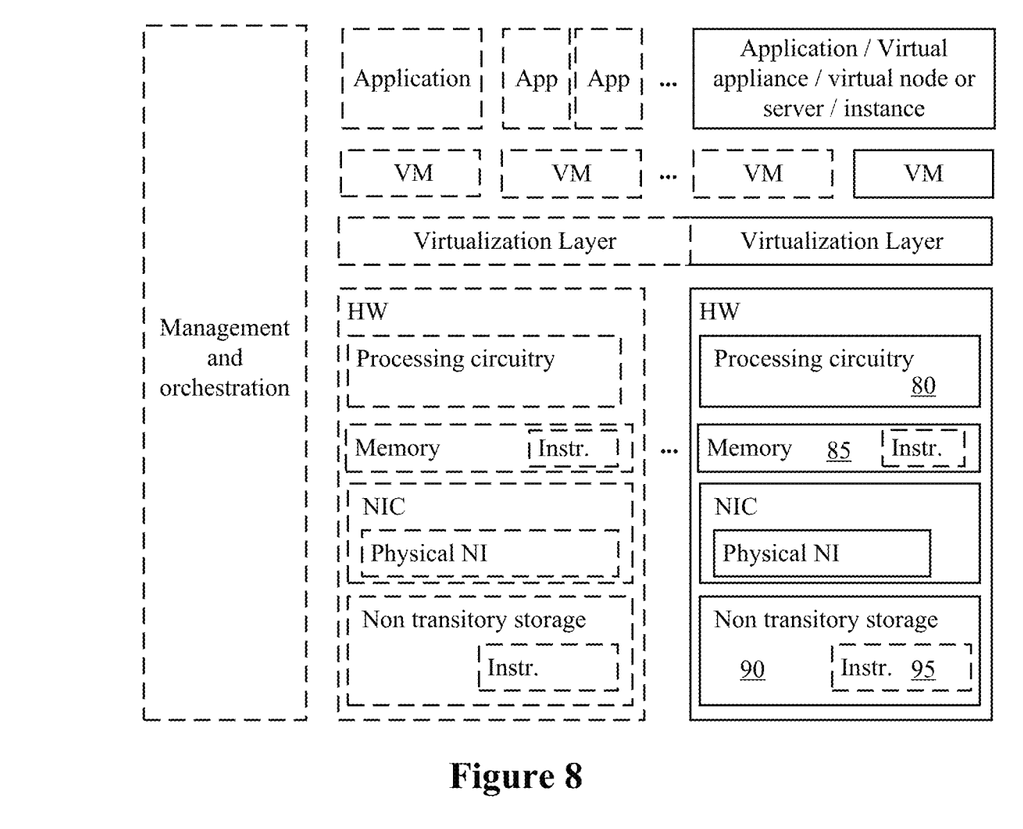
FIG. 8 is a schematic illustration of a virtualization environment in which the different method(s) and apparatus(es) described herein can be deployed.

A virtualization environment (which may go beyond what is illustrated in FIG. 8), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 80 and memory 85. The memory can contain instructions executable by the processing circuitry whereby functions and steps described herein may be executed to provide any of the relevant features and benefits disclosed herein.

The hardware may also include non-transitory, persistent, machine readable storage media 90 having stored therein software and/or instruction 95 executable by processing circuitry to execute functions and steps described herein.

Referring to FIGS. 4-6 and 8, there is provided an Edge Cloud Platform (ECP) for providing a low-latency, distributed, multi-user application. The ECP comprises processing circuits 80 and a memory 85, the memory containing instructions executable by the processing circuits whereby the ECP is operative to determine a first location of a first group of users requesting access to the multi-user application and deploy the multi-user application in a first Point of Presence (PoP) in a first Service Provider (SP) domain operative to serve the first group of users. The ECP is operative to determine a second location of a second group of users requesting access to the multi-user application and deploy a proxy of the multi-user application in a second PoP in a second SP domain operative to serve the second group of users. The ECP is operative to, upon determining that a Software License Agreement (SLA) exists between the first and second SPs, establish a tunnel for linking the multi-user application and the proxy of the multi-user application, thereby providing the low-latency.

The e multi-user application may be a gaming application. The multi-user application and the proxy of the multi-user application may be deployed by a traffic manager. The traffic manager may be operative to select a largest group of users as the first group of users. The traffic manager may be operative to select the first group of users, among multiple groups of users, based on network characteristics that enable achieving lower latencies for all groups of users. The characteristics that enable to achieve lower latencies for all groups of users may be determined using data analytics of network characteristics, a number of users per location, a network status or traffic characteristics.

The Edge Cloud Platform may be further operative to detect changes in the groups of users and move the multi-user application to another PoP in another SP domain. The changes may include more users or less users at a given location, a new group of users at a new location, all users "dropped" at another given location, and wherein moving the multi-user application to another PoP in another SP domain reduces a cumulative latency. The users may be connected through any one of: a cable connection, a short range wireless connection, a long range wireless connection. The tunnel may be established using peering or transit.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for providing a low-latency, distributed, multi-user application through an Edge Cloud Platform, comprising:
   determining a first location of a first group of users requesting access to the multi-user application and deploying the multi-user application in a first Point of Presence (PoP) in a first Service Provider (SP) domain operative to serve the first group of users;
   determining a second location of a second group of users requesting access to the multi-user application and deploying a proxy of the multi-user application in a second PoP in a second SP domain operative to serve the second group of users;
   upon determining that a Software License Agreement (SLA) exists between the first and second SPs, establishing a tunnel for linking the multi-user application and the proxy of the multi-user application, thereby providing the low-latency; and
   detecting changes in the groups of users and moving the multi-user application to another PoP in another SP domain, wherein changes include more users or less users at a given location, a new group of users at a new location, all users "dropped" at another given location, and wherein moving the multi-user application to another PoP in another SP domain reduces a cumulative latency.

2. The method of claim 1, wherein the multi-user application is a gaming application.

3. The method of claim 1, wherein the multi-user application and the proxy of the multi-user application are deployed by a traffic manager.

4. The method of claim 1, wherein the traffic manager selects a largest group of users as the first group of users.

5. The method of claim 1, wherein the traffic manager selects the first group of users, among multiple groups of users, based on network characteristics that enable achieving lower latencies for all groups of users.

6. The method of claim 5, wherein characteristics that enable to achieve lower latencies for all groups of users are determined using data analytics of network characteristics, a number of users per location, a network status or traffic characteristics.

7. The method of claim 1, wherein the users are connected through any one of: a cable connection, a short range wireless connection, a long range wireless connection.

8. The method of claim 1, wherein the tunnel is established using peering or transit.

9. An Edge Cloud Platform for providing a low-latency, distributed, multi-user application, comprising processing circuits and a memory, the memory containing instructions executable by the processing circuits whereby the Edge Cloud Platform is operative to:
   determine a first location of a first group of users requesting access to the multi-user application and deploy the multi-user application in a first Point of Presence (PoP) in a first Service Provider (SP) domain operative to serve the first group of users;
   determine a second location of a second group of users requesting access to the multi-user application and deploy a proxy of the multi-user application in a second PoP in a second SP domain operative to serve the second group of users;
   upon determining that a Software License Agreement (SLA) exists between the first and second SPs, establish a tunnel for linking the multi-user application and the proxy of the multi-user application, thereby providing the low-latency; and
   detect changes in the groups of users and move the multi-user application to another PoP in another SP domain, wherein changes include more users or less users at a given location, a new group of users at a new location, all users "dropped" at another given location, and wherein moving the multi-user application to another PoP in another SP domain reduces a cumulative latency.

10. The Edge Cloud Platform of claim 9, wherein the multi-user application is a gaming application.

11. The Edge Cloud Platform of claim 9, wherein the multi-user application and the proxy of the multi-user application are deployed by a traffic manager.

12. The Edge Cloud Platform of claim 9, wherein the traffic manager is operative to select a largest group of users as the first group of users.

13. The Edge Cloud Platform of claim 9, wherein the traffic manager is operative to select the first group of users, among multiple groups of users, based on network characteristics that enable achieving lower latencies for all groups of users.

14. The Edge Cloud Platform of claim 13, wherein characteristics that enable to achieve lower latencies for all groups of users are determined using data analytics of network characteristics, a number of users per location, a network status or traffic characteristics.

15. The Edge Cloud Platform of claim 9, wherein the users are connected through any one of: a cable connection, a short range wireless connection, a long range wireless connection.

16. The Edge Cloud Platform of claim 9, wherein the tunnel is established using peering or transit.

* * * * *